Dec. 23, 1969  C. W. BIRCH  3,485,121
METHOD AND APPARATUS FOR CHAIN CUTTING
TEXTILE WEBS AND THE LIKE
Filed Aug. 31, 1967  4 Sheets-Sheet 3

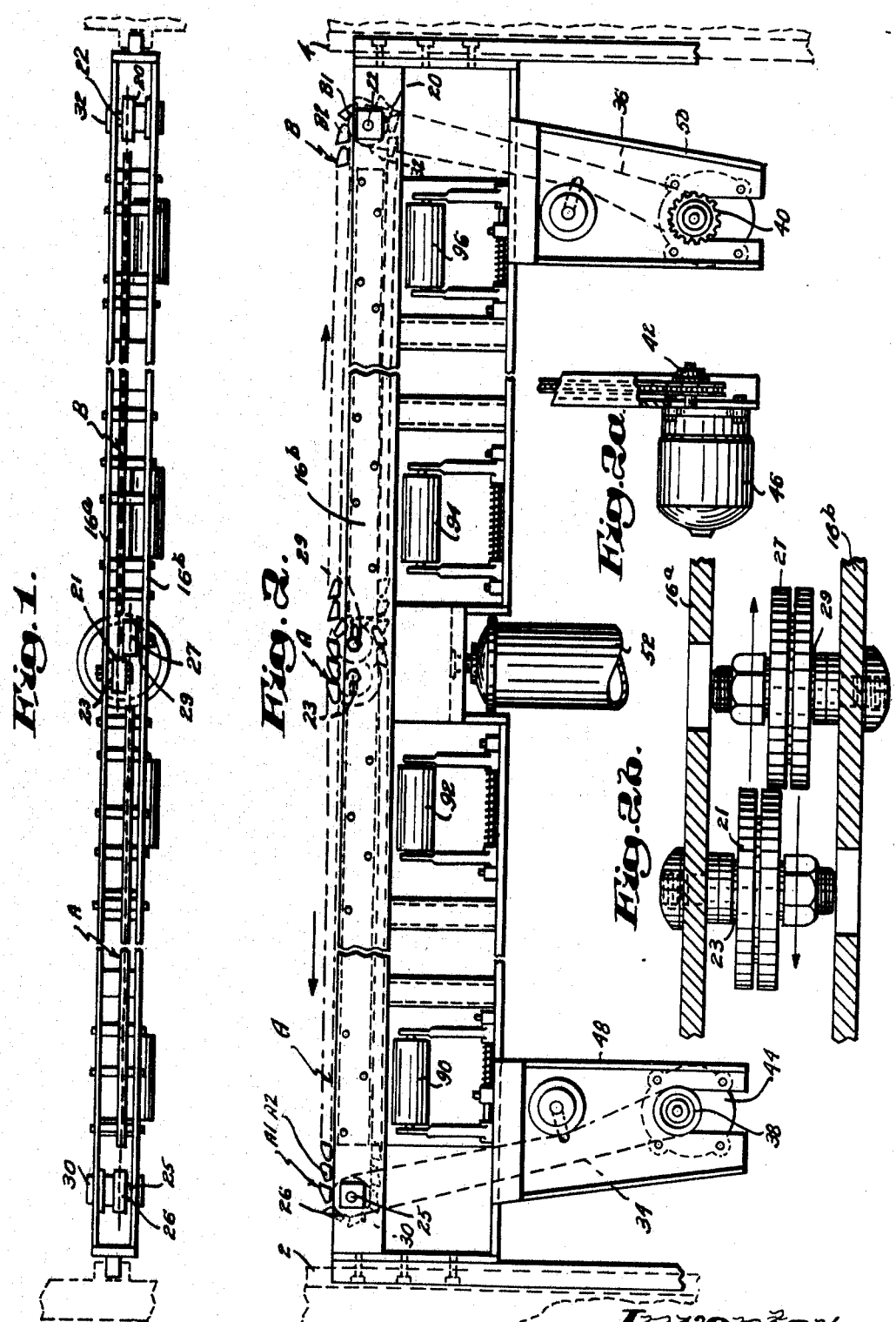

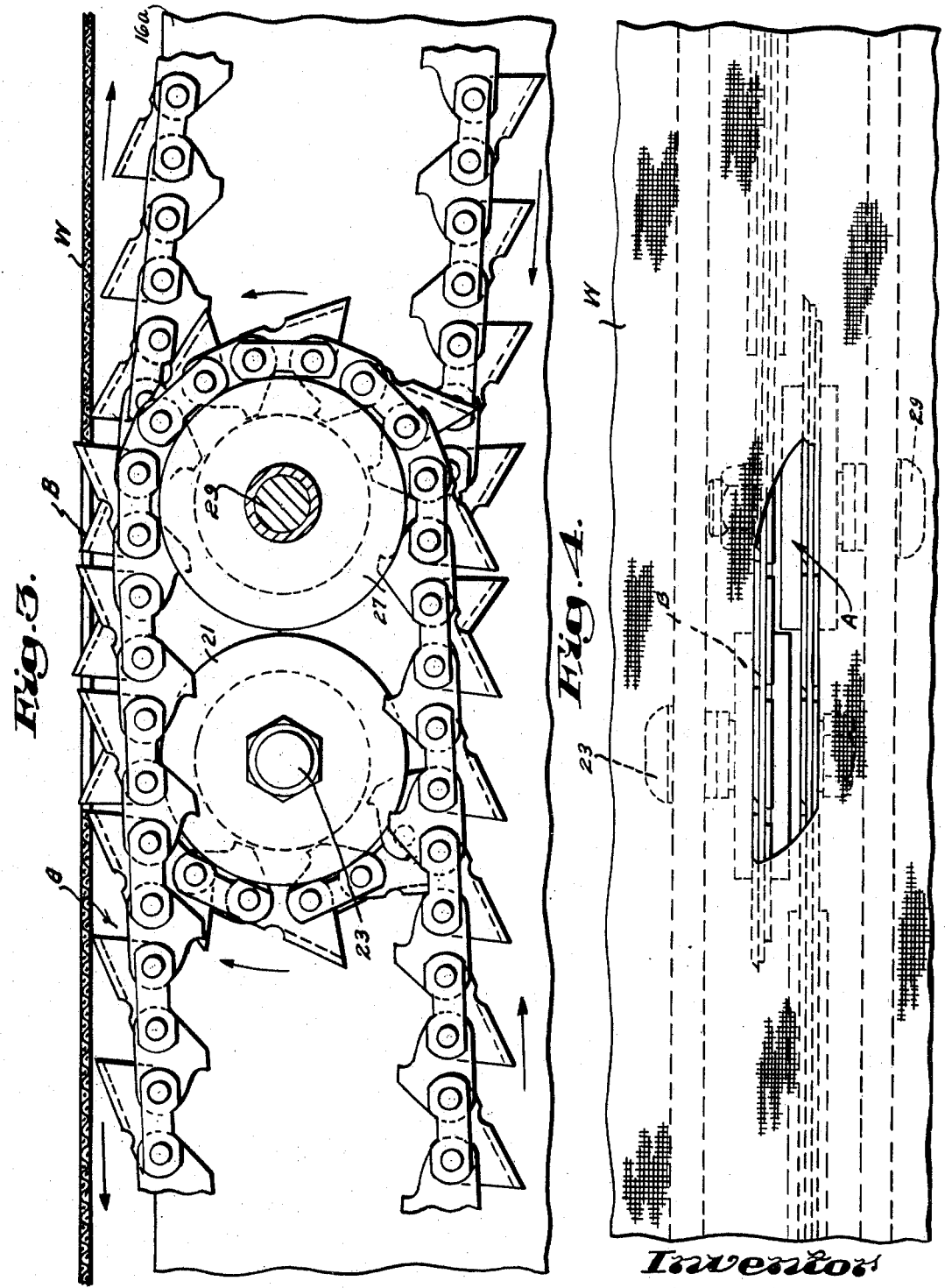

Inventor
Clifford W. Birch
by Manson H. Hamilton
Attorney

Dec. 23, 1969  C. W. BIRCH  3,485,121
METHOD AND APPARATUS FOR CHAIN CUTTING
TEXTILE WEBS AND THE LIKE
Filed Aug. 31, 1967  4 Sheets-Sheet 4
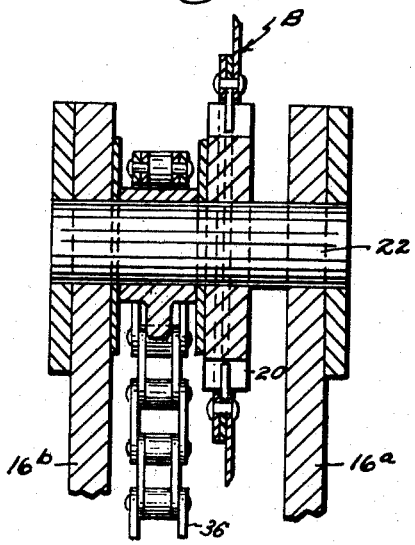
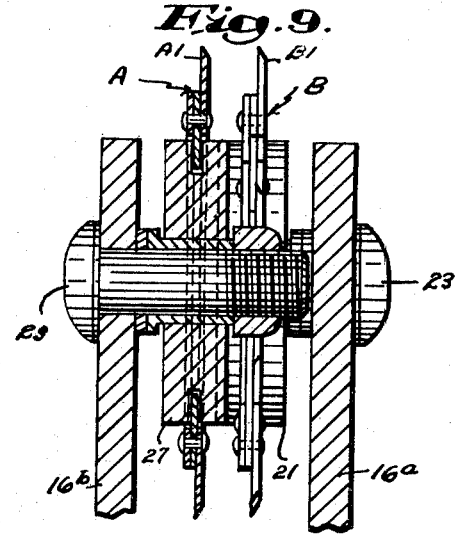
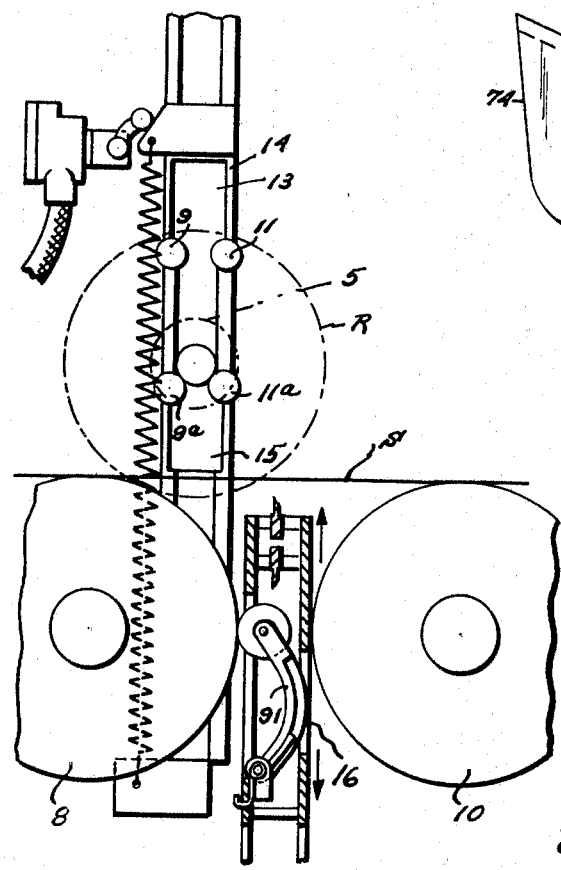
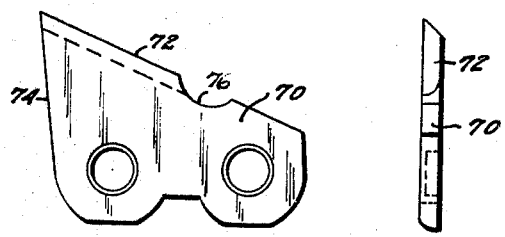
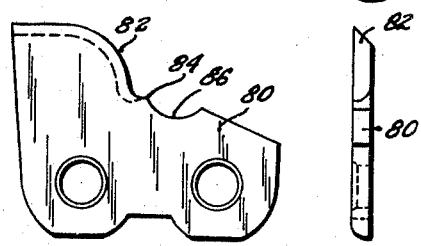
Inventor
Clifford W. Birch
by Munro H. Hamilton
Attorney

United States Patent Office 3,485,121
Patented Dec. 23, 1969

3,485,121
METHOD AND APPARATUS FOR CHAIN CUTTING TEXTILE WEBS AND THE LIKE
Clifford W. Birch, Lexington, Mass., assignor to Birch Brothers, Inc., Somerville, Mass., a corporation of Massachusetts
Filed Aug. 31, 1967, Ser. No. 664,760
Int. Cl. B26d 1/46
U.S. Cl. 83—56                              12 Claims

ABSTRACT OF THE DISCLOSURE

A web of material wound in a web winding machine is cut more satisfactorily at a predetermined point of winding by means of two adjustable oppositely driven chain cutting members. The cutting members are further arranged in the machine in angularly extending relationship to one another to provide for a gradual engagement of the cutting members with the web whereby only a limited number of cutting elements or opposed teeth initially engage the web and undesirable tearing or distorting of the web is avoided with a better cut being accomplished. Independently mounted idler rolls for supporting inner ends of the chain cutters greatly facilitate individual adjustment and tensioning of the cutters in their angularly disposed position. Elongated lapping rolls of improved construction maintain a smoth wrinkle free lapping action on the first few turns of wound material.

---

Figure 5:
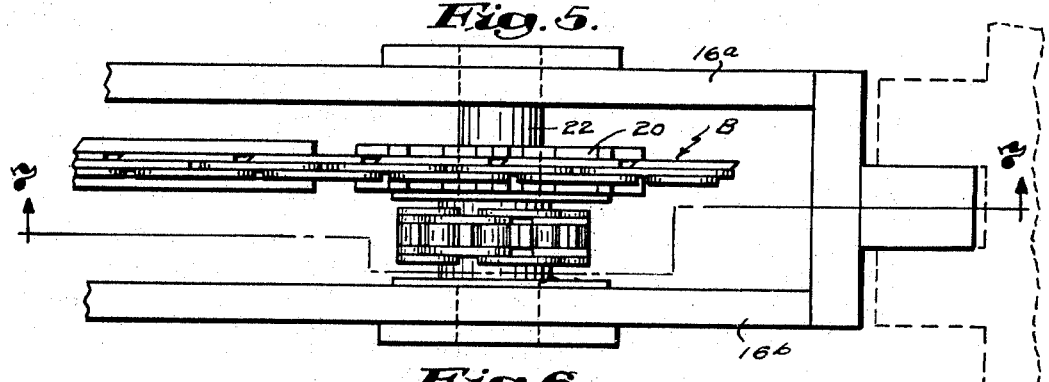

This invention relates to a method and apparatus for cutting a web of material with chain cutter means while the web is supported in a web winding machine of the general class disclosed in Patents Nos. 3,049,311 and 3,047,248. In a more recently issued Patent No. 3,199,393 issued to me under date of Aug. 10, 1965, there is further disclosed one desirable form of chain cutting mechanism which has been found to be an improvement over other forms of cutting mechanisms used in web winding machines.

In a typical winding operation such as that disclosed in U.S. Patent No. 3,049,311, winding starts on a rear driving roll and is completed on a forward driving roll. In the first stage, with the machine at rest, a cylindrical core is mounted in a jaw mechanism in a raised position with respect to the rear driving roll. An end of cloth is led into the machine and hand wrapped around the core. The jaw mechanism is closed and the core lowered into contact with the rear driving roll. Winding is then initiated and continues on this rear driving roll until a partly wound roll of cloth is obtained, with the jaw mechanism becoming raised as the diameter of the roll increases. At a given point when a roll is partially wound the jaw mechanism is opened to release the core and web roll. The partly wound roll is immediately transferred onto the forward driving roll, where a second stage of winding is continued until the required diameter is obtained and the web is ready to be cut.

In earlier forms of web winding machines, cutting means included a vertically reciprocating gate carrying a cutting element capable of being raised upwardly into a position to engage the underside of a stretched span of the web and effect a cut. Difficulties arose in cutting webs of tough highly resistant nature such as those made from synthetic materials and this was particularly the case in dealing with relatively thick heavy webs. To meet this problem there was combined with the vertically reciprocating gate structure a pair of oppositely driven endless chain cutting members arranged as described in Patent No. 3,199,393 and a much more positive cutting action was realized. However, increasing use of the chain type cutter with a winder range of webs has resulted in a need for more precisely controlling and applying the chain cutter in order to provide a smoother and more sharply defined cut and to avoid stretching or tearing.

A chief object of the invention is to improve chain cutting of webs of the class noted. Having in mind the need for more precisely controlling the chain cutting operation, I have conceived of an improved method and arrangement for selectively applying two chain cutting members arranged in an angularly disposed position so that only a limited number of cutting teeth come into engagement with a central section of a web at the start of the cutting operation. Thereafter the remaining cutting progressively come into engagement so that the cut is extended all the way out to the two edges of the web and smoother and more sharply defined cutting edges are produced especially when handling relatively thick difficult web material.

The two chain cutters are located in close proximity nd arranged to have their innermost ends overlapping in staggered relationship. This results in two cuts being initiated at the central section of the web in such close proximity that a small intervening portion of the web is instantly severed and two cuts merge into one. As one suitable means of mounting the chain cutters in an angularly disposed position with their ends in staggered overlapping relation to one anther, I provide two outer shafts and two inner shafts transversely disposed through the gate sides. The inner shafts are located through the gate sides in elongated slots at heights above the two outer shafts. The slots provide for the two inner shafts being adjustably secured to exert varying degrees of tension in order to regulate more precisely the angled cutting action of the two chains.

Figure 6:
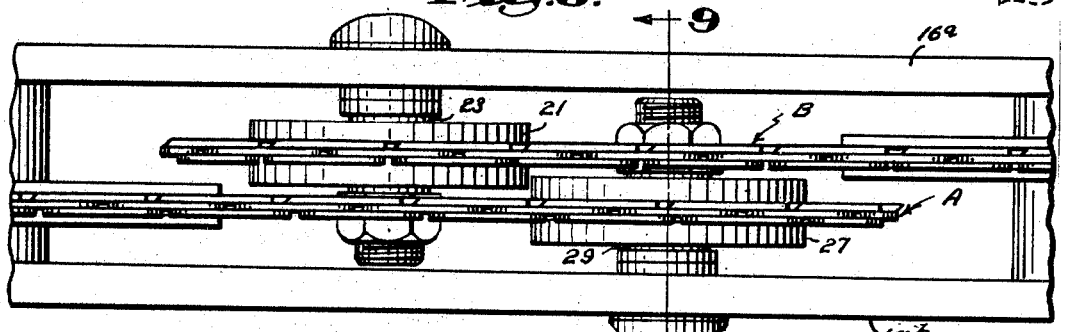
Figure 7:
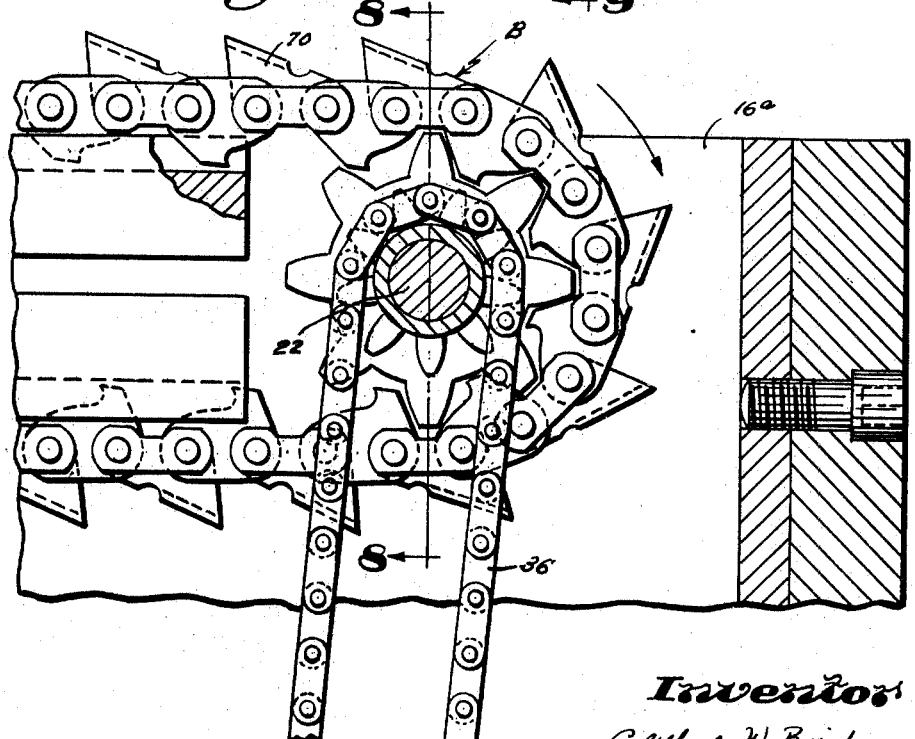

The nature of the invention and its other objects and novel features will be more fully understood and appreciated from the following description of a preferred embodiment of the invention shown in the accompanying drawings, in which:

FIGURE 1 is a plan view of a chain cutting mechanism of the invention;
FIGURE 2 is a side elevational view of the cutting mechanism mounted in a gate member;
FIGURE 2a is a detail view of drive means;
FIGURE 2b is a fragmentary cross sectional view of the center idler rolls;
FIGURE 3 is an enlarged fragmentary elevational view partly in cross section showing a step of initiating a cutting operation in accordance with the method of the invention;
FIGURE 4 is an enlarged fragmentary plan view of the structure shown in FIGURE 3;
FIGURE 5 is a detail fragmentary plan view of the chain cutting mechanism;
FIGURE 6 is another fragmentary plan view of the chain cutting mechanism shown supported on independently located shafts;
FIGURE 7 is a cross section taken on the line 7—7 of FIGURE 5;
FIGURE 8 is a detail cross section taken on the line 8—8 of FIGURE 7;
FIGURE 9 is a detail cross section taken on the line 9—9 of FIGURE 6;
FIGURE 10 is an elevational view illustrating the gate and cutting mechanism in relation to web winding rolls; and
FIGURES 11 to 14 inclusive illustrate forms of cutting elements employed in the invention.

Considering in greater detail the structure shown in the drawings, numerals 2 and 4 denote opposite side frame portions of a web winding machine of the type noted in U.S. Patent No. 3,049,311. Supported between the side frames 2 and 4 is a rear driving roll 8 and a forward driving roll 10. Also supported between the side frames for vertical movement above the rolls 8 and 10 is a winding core 5. As is customary in machines of this class, the ends of the core 5 are received in vertically movable jaws 9, 11, 9a, 11a. These jaws are supported in sides as 13 and 15 in guide parts as 14 located on inner frame surfaces as has been suggested in FIGURE 10.

As winding takes place with the roll R turning on the roll 8, a web roll forms as suggested in dotted lines in FIGURE 10. At some intermediate winding point the core 5, together with the partly wound roll R, is transferred onto the forward driving roll 10 and a stretched span S of material is extended between the two rolls. Winding on this forward driving roll continues until a roll of desired size is formed. At this point cutting of spans S is carried out by causing a vertically reciprocable gate 16 to rise upwardly and to engage a cutting member against the underside of the web span S.

In accordance with the present invention, I employ the same vertically reciprocating gate motion of Patent No. 3,199,393, but in place of the chain cutting means of the patent I substitute angled chain cutters which are supported on idler rolls and sprockets fixed to respective individual inner and outer shafts in a specially constructed gate structure. This gate structure is made with two narrowly spaced apart sides 16a, 16b, joined together at their ends. Each of the sides are formed with central portions of a greater vertical dimension than the end portions, and inner chain shafts are located through the central portions of greater vertical dimension.

The chain cutting mechanism consists of chain cutting member A, B, which as shown in FIGURES 1 and 2 comprise endless sprocket chains with cutters thereon. The chains support the cutting elements in spaced apart relation around outer peripheral portions thereof and included in these cutters are cutting elements A1, A2, etc. on member A, and cutting elements B1, B2 on member B.

Each of the two chains A and B are mounted around separate inner idlers and outer driving sprockets on separate shaft members with the two inner shafts and respective idlers being located in the gate at a higher level than the two outer shafts and their respective sprockets so that inner extremities of the chains A and B are caused to pass around their respective idlers in angled relationship.

In accordance with an important feature of the invention the chain cutters are guided around the two independently adjustable shafts in specially constructed grooved idlers which effectively contain the chain cutters against actual displacement. These idlers are further arranged in exceedingly close proximity to one another so that an inner face of one idler overlaps an inner face of the other idler as best shown in FIGURE 2b and thus the cutting elements are disposed in staggered overlapping relationship and very close to one another. In one preferred arrangement the cutting elements overlap with a spacing of approximately one quarter inch. It thus becomes possible to start two cuts which merge and provide a satisfactory severance in a progressive manner.

As shown in detail in FIGURE 1, chain B is located around outer sprocket 20 and an inner idler 21. Sprocket 20 is supported on outer shaft 22 and inner idler 21 is fixed to a separate shaft 23. Cutting member A is mounted around an outer sprocket 26 on shaft 25 and an inner idler 27 on a separate shaft 29 which is offset relative to the inner shaft 23. The inner idlers 21 and 27 are each made with spaced apart faces which define relatively deep grooves in which the respective chains may be completely contained so that only the teeth project above the faces.

As further illustrated in FIGURE 2 and also FIGURE 3, the gate structure 16 with its relatively greater midsection is employed to support the two separate inner shafts 23 and 29 in a relatively higher position than shafts 22 and 25, with the result that the two chains are guided along inclined paths of travel. The innermost portions of the two chains A and B are therefore located appreciably above the outer portions and these innermost portions come into contact with the web force before other portions of the chains engage.

It is pointed out that by employing two separate inner shafts 23 and 29 which are located through the outer surfaces of the sides 16a and 16b respectively in place of a single shaft as employed in Patent No. 3,199,393, and by allowing the shafts to extend inwardly in staggered relation, it becomes possible to locate the faces of the idlers 21 and 27 so that they overlie one another as shown in FIGURE 2b and the chains A and B are thereby disposed in very close proximity to one another and also in a staggered overlapping relationship as further illustrated in FIGURES 1 and 2. This important relationship of parts is still further indicated on a somewhat larger scale in FIGURES 3 and 4.

It will also be observed that by having the two cutter chains approach the web while in an angularly disposed and overlapping position, a highly selective cutting action may be initiated with two closely adjacent small cuts being formed by those cutter elements first engaging the web at the region of overlapping, and the web is cleanly severed at this point. As the chains move upwardly in response to movement of the gate, the cut is extended in two directions and the web becomes completely separated along a sharply defined line of cutting.

Also fixed on shafts 22 and 26 are sprockets 30 and 32 which carry sprocket chains 34 and 36 extending downwardly around respective sprockets 38 and 40 mounted on shafts as 42 of respective motors 44 and 46. The motor members are solidly secured to side portions of depending sprockets 48 and 50 welded or otherwise secured to the gate 16 and operated by an electrical circuit not shown in the drawings. Gate 16 is adapted to be raised and lowered by means of a pneumatic actuating cylinder 52 centrally located in the base of the machine. Further details of this electromechanical control apparatus are disclosed in Patent No. 3,199,293.

FIGURES 11–14 inclusive, illustrate in detail preferred cutting elements in two modified forms. In FIGURES 11 and 12, I have illustrated an improved form of cutter having a body portion 70 at the upper side of which is formed an angled cutting edge 72 which extends upwardly to merge with a side edge of the cutter 74 and forming a generally V-shaped part. At an intermediate portion the cutting edge is interrupted by a recessed part 76. This cutter when ground with a bevelled edge and employed with an angularly disposed chain of the type disclosed herein, is found to provide good results in cutting a relatively heavy web material.

In FIGURES 13 and 14, I have disclosed another form of cutter which is designed for use with soft loosely woven fabrics in order to prevent excessive pulling and distorting and to obtain a sharp cut. In this form of cutter a body portion 80 is formed with an upper cutting edge 82 of a generally arcuate form with a curved edge which extends downwardly and is interrupted at a recessed part 84 as shown in FIGURE 13. The cutter is also recessed at a second point 86. This arrangement provides for fabric material of soft losely woven nature being engaged with cutting taking place along the curved edge in a somewhat quicker fashion than occurs with the edge 72 of FIGURE 11. It is intended that various other changes and modifications in the cutter element may be resorted to if desired.

In dealing with either very hard fabrics or relatively soft loosely woven fabrics, it is found to be important to maintain the fabric as it is wound by the first roll, namely roll 8, in as smooth wrinkle-free condition as possible in order to provide for the chain cutting action being most effective. The lapping rolls are employed during the first few turns so as to maintain the cloth wrinkle-free as it is wound around the shell 5. I have found that the chain cutting operation may be improved by employing a plurality of specially formed lapping rolls as 90, 92, 94 and 96 in the gate mechanism. Each roll is mounted on an arm member as, for example 91, and movable upwardly into engagement with the web material wound on the shell 5.

An important consideration in using these lapping rolls is to make them of an elongated from and in one preferred embodiment of an axial length which is appreciably greater than the lapping roll diameter. This provides a uniform spreading or lapping action which is found to prevent distortion or undesirable tensioning in the web as well as wrinkling. The lapping rolls 90 through 96 are more clearly shown in FIGURE 2 and these rolls as illustrated therein have diameters which are significantly smaller than their axial lengths and they are supported in suitable bearing members for rotative movement.

From the foregoing description it will be seen that I have disclosed a means for cutting difficult web materials including both relatively soft and relatively hard fabrics, and particularly those formed of tough highly resistant synthetic materials. The variation in cutting elements, together with the control of tension by adjusting the angled idler rolls independently of one another, allows the machine to be quickly converted into use for either relatively hard or relatively soft loosely woven webs as the case may be and the rolled material during the first few turns is maintained wrinkle-free to most effectively apply the angled chain cutting apparatus.

While I have shown preferred embodiments of the invention, changes and modifications may be resorted to within the scope of the appended claims.

I claim:

1. A web winding machine for winding a web of material into a roll and cutting a stretched span of the web when the roll is of a desired size, said winding machine comprising a frame having a vertical adjustable core, a rear driving roll supporting and winding a partially formed roll of the material around the core, a forward driving roll located in the frame in horizontally spaced relation to the rear driving roll for receiving and driving the partially wound roll of material while supporting a stretched span of the material extending between itself and the rear driving roll, a vertical reciprocating web cutter mechanism mounted in the frame at points between the driving rolls and movable into contact with an underside of the stretched span of material when the partially formed roll reaches a desired size, said web winding mechanism comprising a pair of angularly disposed endless chain cutters and means for moving the chain cutters upwardly into contact with the stretched span of material along inclined paths of travel to provide for progressive engagement of the cutters with the material.

2. A structure according to claim 1 in which the chain cutters have inner ends thereof arranged in overlapping staggered relationship.

3. A structure according to claim 1 in which the chain cutters comprise two endless chain members having a plurality of spaced apart cutter elements mounted therearound, the said chain cutter elements presenting body portions pinned to the chain and presenting arcuate cutting edges which extend throughout a portion only of the upper side of each cutter member.

4. A structure according to claim 1 in which the chain cutters comprise two endless chain members having a plurality of spaced apart cutter elements mounted therearound, the said chain cutter elements presenting angled cutting edges which are interrupted by recessed intermediate portions therealong.

5. A structure according to claim 1 in which the web winding machine includes a vertically reciprocating gate for supporting the chain cutter members and a plurality of lapping rolls adjustably supported in the gate mechanism, each of said lapping rolls being formed with an axial length which exceeds the diameter thereof to apply extended lapping forces and maintaining a web of material in a wrinkle-free condition as it is being wound on the machine.

6. A web winding machine for winding a web of material into a roll and cutting a stretched span of the web when the roll is of a desired size, said winding machine comprising a frame having a vertically adjustable shell, a rear driving roll for supporting and winding a partially formed roll of the material around the shell, a forward driving roll located in the frame in horizontally spaced relation to the rear driving roll for receiving and driving the partially wound roll of material while supporting a stretched span of the material extending between itself and the rear driving roll, a vertically reciprocating web cutter mechanism mounted in the frame at points between the driving rolls and movable into contact with a stretched span of material extending between the rolls when the partially formed roll reaches a desired size, said web cutter mechanism including a web cutter support structure, a pair of endless chain cutter members mounted in the support structure for travel in opposite directions, each of said endless chain cutters having a plurality of spaced cutter elements fixed thereto, inner ends of the chain cutter members being rotatably mounted about separate inner shafts loacated in the cutter support structure in axially spaced relationship, the outer ends of said chain cutter members being rotatably mounted on two outer driven shafts located in the cutter support structure, power driving means attached at the underside of the cutter support structure for actuating said chain cutter member when the cutter support structure is in a raised position, the axes of rotation of the said inner shafts being located above the axes of rotation of the two outer shafts to guide the chain cutter members along inclined paths of travel which extend outwardly and downwardly thereby to move those portions of the chain cutting members passing around the inner axes of rotation into engagement first with the stretched span of material and to initiate a cut, and relatively lower cutter elements on said chain members being arranged to progressively engage the web and complete the cut during further upward travel of the cutter support structure.

7. A structure according to claim 6 in which the web cutter support structure includes a pair of spaced apart sides and the said inner shafts being located through the said spaced apart sides in opposed relationship.

8. A structure according to claim 7 in which the said spaced apart sides of the web cutter support structure are formed with means for adjustably tensioning each of the inner shafts.

9. A structure according to claim 8 in which the said means consists of elongated angularly extending slot portions and holding members associated therewith.

10. A structure according to claim 6 in which the web cutter support structure has mounted therein a plurality of lapping roll assemblies and said lapping rolls being constructed of an axial length greater than their respective diameters and engageable with a partially wound web of material on the rear driving roll for preventing wrinkling of the material.

11. In a method of winding a web of material into a roll and cutting a stretched span of the web when the roll is of a desired size, the steps which include moving a vertically reciprocable web cutter mechanism upwardly at a predetermined point and engaging portions of two opposed chain cutting members with the web to initiate a cut at a limited area therealong and then moving the same cutting members upwardly a further distance to progressively engage the web and complete the cut.

12. A method according to claim 11 in which the chain cutters are driven along inclined paths of travel during their upward movement.

(References on following page)

References Cited

UNITED STATES PATENTS

| | | | |
|---|---|---|---|
| 3,199,393 | 8/1965 | Birch | 83—563 |
| 2,665,757 | 1/1954 | Stevens et al. | |

WILLIAM S. LAWSON, Primary Examiner

U.S. Cl. X.R.

83—563, 646; 143—32; 242—56